(12) United States Patent
Emmanuel et al.

(10) Patent No.: US 10,244,040 B2
(45) Date of Patent: Mar. 26, 2019

(54) CONTENT EVENT NOTIFICATIONS

(71) Applicant: LinkedIn Corporation, Mountain View, CA (US)

(72) Inventors: Jeba Singh Emmanuel, Mountain View, CA (US); Andri H. Kristinsson, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 326 days.

(21) Appl. No.: 14/720,480

(22) Filed: May 22, 2015

(65) Prior Publication Data

US 2016/0344800 A1 Nov. 24, 2016

(51) Int. Cl.
*H04L 29/08* (2006.01)
*G06Q 10/00* (2012.01)

(52) U.S. Cl.
CPC ............. *H04L 67/10* (2013.01); *G06Q 10/00* (2013.01); *H04L 67/26* (2013.01); *H04L 67/325* (2013.01)

(58) Field of Classification Search
CPC ....... H04L 67/10; H04L 67/26; H04L 67/325; G06Q 10/00
USPC .......................................................... 709/204
See application file for complete search history.

(56) References Cited

U.S. PATENT DOCUMENTS

| | | | | |
|---|---|---|---|---|
| 6,694,352 B1 * | 2/2004 | Omoigui | ................. | H04L 29/06 709/205 |
| 8,291,451 B2 * | 10/2012 | Roberts | .............. | H04N 7/17318 725/37 |
| 8,291,454 B2 * | 10/2012 | Gossweiler, III | ........................... | G06F 17/30017 725/40 |
| 8,543,441 B2 * | 9/2013 | Siegel | ................. | G06Q 10/109 455/456.1 |
| 8,631,070 B2 * | 1/2014 | Vance | .................. | G06Q 10/109 709/204 |
| 8,694,593 B1 * | 4/2014 | Wren | ..................... | G06Q 50/10 709/206 |
| 9,208,153 B1 * | 12/2015 | Zaveri | ............... | G06F 17/30867 |
| 9,473,819 B1 * | 10/2016 | Bostick | ........... | H04N 21/44222 |
| 2004/0068481 A1 * | 4/2004 | Seshadri | ........... | G06F 17/30867 |
| 2005/0021540 A1 * | 1/2005 | McKee | .................. | G06Q 10/10 |
| 2005/0144266 A1 * | 6/2005 | Antonelli | ................ | H04L 29/06 709/223 |

(Continued)

*Primary Examiner* — Patrice L Winder
*Assistant Examiner* — Aye M Aung
(74) *Attorney, Agent, or Firm* — Park, Vaughan, Fleming & Dowler LLP (57) ABSTRACT

A system, method, and apparatus are provided for issuing content event notifications to members of a user community that makes content available to its members. Events involving content items of interest to a given member (e.g., creation, upload, sharing) are recognized, particularly events that involve another member connected to the given member in the community, and the relevance of the items to the member or to content topics of interest to the member is determined. Time slots during which notifications can be issued to the member are identified (e.g., using the member's calendar data), possibly in association with events on the member's calendar, and may be associated with one or more topics that interest the member. During a time slot, only notifications regarding content items related to the associated topic(s) may be issued. A do-not-disturb time slot may be defined as a period during which no notifications should be issued.

21 Claims, 3 Drawing Sheets

(56) References Cited

U.S. PATENT DOCUMENTS

| | | | |
|---|---|---|---|
| 2006/0123084 A1* | 6/2006 | Heidloff | G06Q 10/107 709/206 |
| 2006/0282303 A1* | 12/2006 | Hale | G06F 17/30731 705/7.11 |
| 2008/0183485 A1* | 7/2008 | Drabble | G06Q 30/02 705/1.1 |
| 2011/0153768 A1* | 6/2011 | Carter | G06Q 10/10 709/207 |
| 2011/0161987 A1* | 6/2011 | Huang | G06Q 10/10 719/318 |
| 2012/0179980 A1* | 7/2012 | Whalin | H04W 4/21 715/753 |

\* cited by examiner

CONTENT EVENT NOTIFICATIONS

BACKGROUND

This disclosure relates to the field of computers. More particularly, a system, method, and apparatus are provided for issuing notifications regarding electronic content.

In some computing environments, a system that serves electronic content or otherwise makes electronic content available to users sends notifications regarding that content too often. In these environments, after a given user subscribes to a particular type of content or expresses some interest in it, the system may send the user notifications every time a new content item of that type becomes available. Depending on the frequency of receipt of notifications, the user may become frustrated with constant interruptions and/or having to clear the notifications (e.g., on his or her mobile device). In addition, not all of them will be of interest.

Even systems that may restrain from issuing frequent notifications may tax their users' patience with ill-timed notifications. For example, when a user is preparing for an important meeting or an interview, he or she does not want to be bothered with notifications regarding irrelevant content. Nonetheless, the user may receive notifications at inconvenient times that interrupt other activity.

DETAILED DESCRIPTION

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for issuing content event notifications in a timely manner, via electronic mail, instant message, a mobile application, or other means. In these embodiments, a content event notification is a notification regarding one or more items of electronic content (e.g., an article, a presentation, a report, an audio recording, a video), and may be initiated by or result from a discrete content event. Such content events include virtually any action associated with or concerning a content item (e.g., creating, uploading, posting, liking, sharing, commenting, editing, curating, serving, opening).

In some embodiments, only certain content events may result in a notification being issued or dispatched to a given user. For example, content events that involve another user who is connected to the given user in some manner in a user community (e.g., a professional network, a social network) may initiate notifications, while events that do not involve a connected user or someone with whom the user has a relationship may not cause notifications to be sent.

In some implementations, however, the given user may also (or instead) receive notifications regarding events associated with content that is known or suspected to be highly relevant to the given user, even if the corresponding content event does not involve anyone with whom the given user is connected or has a relationship. If a new item of content becomes available, and belongs to a topic or type that interests that user, the given user may automatically become a candidate for receiving a corresponding content event notification. Thus, the existence of a (relevant) content item, within a collection of content available for access to users, may itself be considered a content event.

Relevant content and/or the user's interest in a particular type/topic of content may be determined based on the user's explicit identification or description of such content, may be learned from his or her behavior with various content items, may be estimated or inferred from behavior of other users (e.g., similar users, connected users), and/or may be determined in other ways.

Thus, content events that could result in a notification being sent to a particular user may be filtered based on the corresponding content items, their associated types/topics (e.g., depending on how relevant or interesting it is to the user), the type of content event that occurred (if any), identities of other users involved in the events, and/or other factors.

In addition, however, content event notifications may be issued in a manner intended to accommodate the recipient's activities, his or her current or future location, and/or the time of day. Thus, if it is known that the recipient has an upcoming meeting, interview, conference, or other event of a particular nature, close in time to that event the system may only send a notification that is related to (or that involves content that is related to) the event.

For example, if the recipient is due to join a meeting regarding a new project involving computer messaging, near the time of the meeting the system may send a notification about content that is related to messaging technology, and may refrain from sending notifications regarding other topics. As another example, if the recipient is commuting home from work at the end of the day, the system may send a notification regarding a casual topic, such as food, vacation ideas/locations, sporting events, etc., and refrain from sending notifications regarding work-related content.

For the purpose of determining when to send notifications to a user regarding different types of content and/or different events, in some embodiments the system identifies one or more time slots that correlate with the user's activity. Thus, if one user has a daily status meeting regarding a particular topic, a time slot for receiving notifications regarding related content may be defined to include and/or precede the time of that meeting. For another user, time slots may be defined to encompass or correlate to the user's commutes to and/or from work.

With each time slot, any number of content topics or types of content may be associated, in which case only content event notifications related to such content will be issued to the user during the time slot. Illustratively, these associated topics may be learned from a description of the event that accompanies the time slot (e.g., the subject of a scheduled meeting or conference), from an inferred or explicit role of the user (which may be correlated with pertinent content topics), or may be learned some other way.

Also, over time, the system may learn from a user's behavior (e.g., which content items he or she accesses) the types of content that are most interesting or relevant at particular times. In some embodiments, however, the system accesses a user's calendar or schedule to identify events in the user's life, and/or may use location information to determine the user's current or usual location—which may be coarse-grained (e.g., country, region, state, city, time zone) or fine-grained (e.g., as determined by a GPS receiver)—and may also consider the user's local time. Users' time zone (e.g., current time zone, default or usual time zone, temporary time zone) may be mapped to coordinated universal time (UTC) and/or a common zone, such as the time zone in which the system operates.

Figure 1:
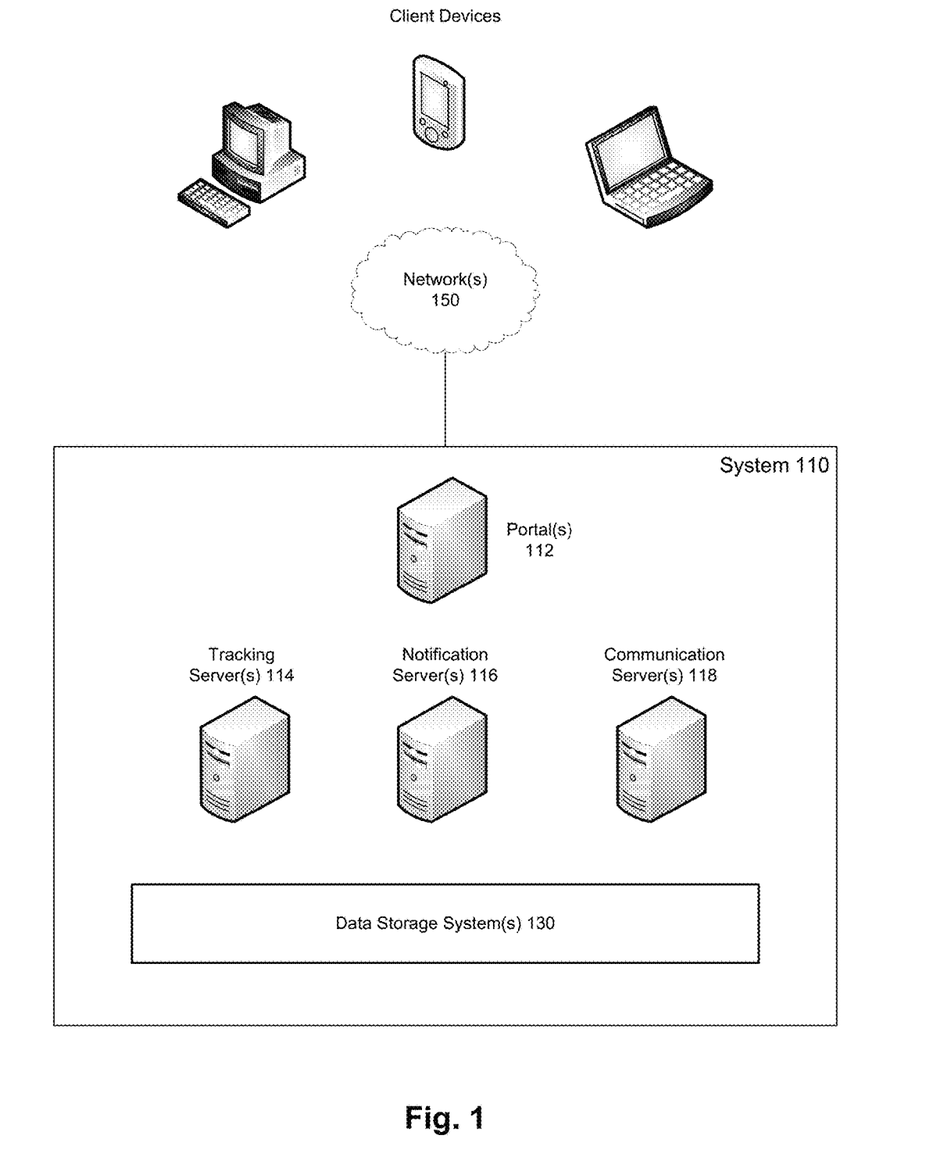
FIG. 1 is a block diagram depicting a computing environment in which content event notifications are issued in accordance with some embodiments.

FIG. 1 is a block diagram depicting a computing environment in which content event notifications may be issued, according to some embodiments.

System 110 of FIG. 1 is (or is part of) a data center that supports or hosts a community or network of users, such as a professional network or a professional social network offered by LinkedIn® Corporation. Users of system 110 may be termed members because they may be required to register with the system in order to use features of the system. Members may be identified and differentiated by username, electronic mail address, telephone number, and/or some other unique identifier. The system provides one or more applications or services for presenting content to members, and thus may strive to provide notifications to members regarding interesting content at times that are appropriate to the member.

Users/members of applications and/or services hosted by system 110 connect to the system via client devices, which may be stationary (e.g., desktop computer, workstation) or mobile (e.g., smart phone, tablet computer, laptop computer). In order to interact with the system (e.g., to view content, submit or edit content) the client devices operate suitable client applications, such as a browser program or an application designed specifically to access a service offered by system 110.

Client devices are coupled to system 110 via direct channels and/or one or more networks 150 or other shared channels, which may include the Internet, intranets, and/or other networks, and may incorporate wired and/or wireless communication links.

Via the client devices and the applications they execute, members are able to submit content to the professional community, receive content submitted by other members, exchange messages with other members, and otherwise interact within the community. Various mechanisms or functions may be offered by system 110 to promote such information exchange, to allow members to "share," "post," or "like" some particular content, to comment upon or forward the content, to upload or create a link to content, to connect to or to follow another member, to subscribe to content channels, to make and receive endorsements and recommendations, and so on. Any interaction with an item of content by a member or by the system may be considered a "content event" for purposes of embodiments described herein.

Interactive user/member sessions with system 110 are generally made through a portal 112, which may comprise a web server, an application server, and/or some other gateway or entry point. The portal through which a given session is established may depend on the member's device or method of connection. For example, a user of a mobile client device may connect to system 110 via a different portal (or set of portals) than a user of a desktop or workstation computer.

System 110 also includes tracking server 114, notification server 116, optional communication server, and data storage system 130. Any server described as part of system 110 may alternatively be implemented as or termed a service, platform, or other entity.

Tracking server 114 monitors and records (e.g., within data storage system 130 and/or elsewhere) activity of system 110 and/or members—particularly content events. For example, whenever content is served by the system (e.g., to a client device), the tracking server may be informed of what is served, to whom (e.g., which member), when it was served, and/or other information. Similarly, the tracking server may also record member actions regarding content, to include identities of the members and the content acted upon, the action that was taken, when the action was taken, etc. Illustrative actions that may be captured include, but are not limited to, creating a content item, opening an item, visiting a page associated with a subject or provider of an item, taking some other action regarding a content item (e.g., commenting on it, sharing it, following it or its provider, liking it, uploading it, subscribing to it), altering a member profile, and so on.

Notification server 116 is informed of events and/or other activity noted by tracking server 114, or may be informed in parallel with the tracking server. For some or all events of which it is informed, notification server 116 determines whether a corresponding notification should be sent to any members or users.

In some implementations, notification server 116 comprises multiple worker processes, which handle the events/activities received by the server. In response to a given occurrence, the responsible worker process will identify members, if any, that should be notified. Illustratively, this action may involve recognizing a member (or members) involved in the occurrence, identifying other members that are connected to the recognized member(s) in some way (e.g., an explicit social/professional connection, as a follower), and determining whether content associated with the occurrence (e.g., a new content presentation, a post, an article) is relevant to the identified members and/or other members (and, possibly, how relevant it is to those members).

As described in more detail below, if it is determined that an identified member should receive a notification, the notification server may immediately send the notification, or may queue, buffer, or store it for possible transmission at some later time. For example, notifications regarding different content types or topics may be sent during different time slots, and notification server 116 (or some other component of system 110) may store notifications for possible dispatch during corresponding time slots, may discard notifications that cannot be sent at the time they are created, or may manage the issuance of content event notifications in some other way.

Notification server 116 may store notifications (or information that can be used to generate or replicate notifications) in data storage subsystem 130 and/or elsewhere. Illustratively, the notification server (or some other component of system 110) may maintain a database or other repository of notifications, in which different notifications destined for a given user may have different priorities or weights. These priorities or weights may be used to order the notifications for dispatch, to determine which notification(s) to send during different time slots identified for the user, and/or may be used for other purposes.

Communication server 118 is coupled to telephone service providers and/or other communication links and is capable of dispatching notifications to members via mobile devices (e.g., smart phones), stationary computing devices, and possibly other devices. Thus, a given notification may be dispatched via networks 150 and/or via a telephone service provider's telephone network, which may overlap with networks 150.

Data storage system 130, which may be a distributed data storage system, and/or components of the data storage system (e.g., separate storage engines), include appropriate data storage devices (e.g., disks, solid-state drives), and store data used by portal 112, tracking server 114, notification server 116, communication server 118, and/or other components of system 110 not depicted in FIG. 1.

The system may also include various other servers, services, platforms, or other entities.

For example, a profile server may maintain profiles of members of the service(s) hosted by system 110, which may be stored in data storage system 130 and/or elsewhere. An individual member's profile may include or reflect any number of attributes or characteristics of the member, including personal (e.g., gender, age or age range, interests, hobbies, member ID), professional (e.g., employment status, job title, job location, employer or associated organization, industry, functional area or role, skills, endorsements, professional awards, seniority), social (e.g., organizations the user is a member of, geographic area of residence, friends), educational (e.g., degree(s), university attended, other training), etc. A member's profile, or attributes or dimensions of a member's profile, may be used in various ways by system components (e.g., to identify or characterize the member, to characterize content accessed by the member, to determine content topics/items that may interest the member, to select content to serve to the member, to record a content event).

Organizations may also be members of the service(s) offered by system 110 (i.e., in addition to individuals), and may have associated descriptions or profiles comprising attributes such as industry, size, location, goal or purpose, etc. An organization may be a company, a corporation, a partnership, a firm, a government agency or entity, a not-for-profit entity, a group or collection of associated members, or some other entity formed for virtually any purpose (e.g., professional, social, educational). Either or both organizations and individual members may "follow" and/or be followed by other members, may share and/or received shared information, may initiate and receive communications with other members, may post content and/or receive content posted by other members, may form connections with other members, etc.

A content server (not depicted in FIG. 1) may maintain one or more repositories of content items for serving to members (e.g., within data storage system 130 and/or elsewhere), an index of the content items, and/or other information useful in serving content to members. Illustratively, a content server may serve on the order of hundreds of millions of content items or objects every day. A content store may include various types of sponsored and/or unsponsored content items for serving to members and/or for use by various components of system 110, which may be generated within the system or by external entities. A content service (or some other component of system 110) may include a recommendation module for recommending specific content to serve to a member.

A connection server (not depicted in FIG. 1) may maintain members' connections with other members. Such connections may be stored as a graph, for example, in which different nodes represent different members and a link between two given nodes represents a connection, which may be formed explicitly or implicitly. An explicit connection may be formed when two members establish a formal connection (e.g., one of them accepts a connection request issued by the other); an implicit connection may be formed automatically when one member takes some action that involves another member (e.g., sends a communication, follows or subscribes to the other member, comments on a post or other content provided by the other user).

Members of a service hosted by system 110 have corresponding "identity" or "home" pages (e.g., web pages, content pages) on the system, which they may use to facilitate their activities with the system and with each other, to view content, to form connections/relationships with other members, to view their connections and/or information regarding their connections, to review/modify their profiles, to inform friends and/or colleagues of developments in their lives/careers, to send/receive communications, etc. These pages (or information provided to members via these pages) are available to some or all other members. Members' identity pages may be stored within data storage system 130 or elsewhere.

System 110 may include yet other components not illustrated in FIG. 1. Also, functionality attributed herein to system 110 may be distributed among its components in an alternative manner, such as by merging or further dividing functions of one or more components, or may be distributed among a different collection of components. Yet further, while depicted as separate and individual hardware components (e.g., computer servers) in FIG. 1, one or more of portal 112, tracking server 114, notification server 116, and communication server 118 may alternatively be implemented as separate software modules executing on one or more computer servers. Thus, although only a single instance of a particular component of system 110 may be illustrated in FIG. 1, it should be understood that multiple instances of some or all components may be utilized.

Figure 2:
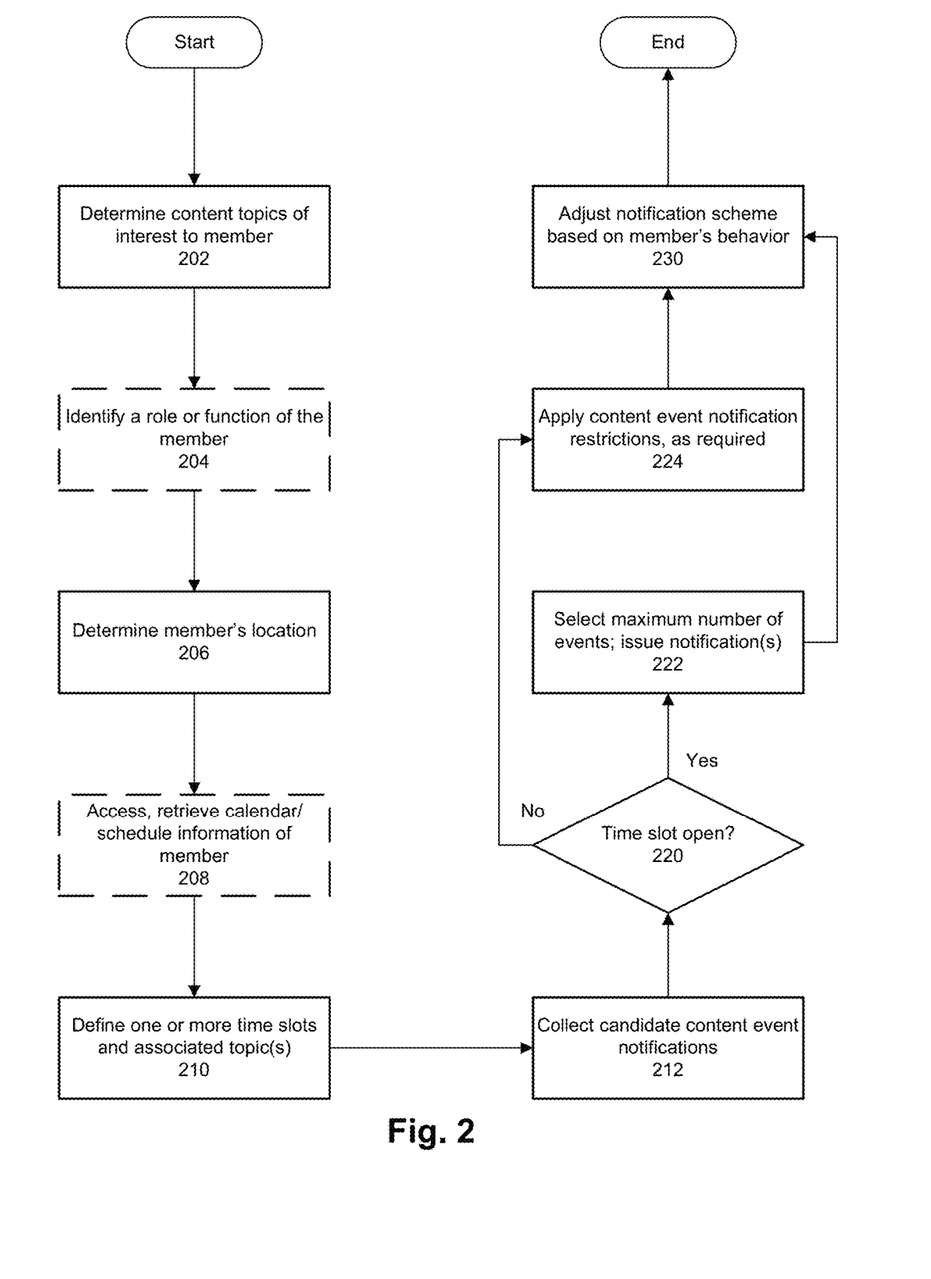
FIG. 2 is a flow chart illustrating a method of issuing content event notifications in accordance with some embodiments.

FIG. 2 is a flow chart illustrating a method of issuing content event notifications, according to some embodiments. In other embodiments, one or more of the illustrated operations may be omitted, repeated, and/or performed in a different order. Accordingly, the specific arrangement of steps shown in FIG. 2 should not be construed as limiting the scope of the embodiments.

These embodiments are described as they may be implemented to dispatch or issue notifications regarding content and/or content events, but may be modified without undue effort to involve sending the actual content or content items (e.g., documents, articles, presentations, graphics, audio, video) instead of just notifications. The content event notifications may be dispatched to recipients via their mobile communication devices (e.g., smart phones) in some implementations, and in others may be directed to mobile or stationary computing devices.

In operation 202, content interests of a member or user of a community of users (e.g., a professional social network, users of a content-serving service) are determined. In some implementations, this may entail identifying an affinity of the member for each of one or more content topics, themes, categories, classifications, channels, subjects, types, etc. (collectively referred to as content topics herein).

For example, the member may explicitly subscribe to or follow one or more sources of content within any number of topics, such as a content publisher or an influential member (e.g., an "influencer"). Also, or instead, he may "like," "share," or otherwise interact with multiple items having a particular content topic, in which case an affinity with that topic may be inferred.

Content topics that are of interest to a member may also or instead be determined from tags affixed to content he has accessed or interacted with, searches he has conducted, and his skills (e.g., in his profile within the community), as well as skills of other members (e.g., members like him, members he is connected to, members he has interacted with), searches they have conducted, tags affixed to content they have accessed, and the content topics they have explicitly identified or that have been inferred from their activity.

Regardless of how the member's content interests are determined, as a result of operation 202, some number of topics is associated with the member. The member may be deemed to have different levels or degrees of interest in the different topics, which may help prioritize content event notifications. A given topic may be identified succinctly (e.g., software development, sports), may be verbose (e.g., How to become a distinguished software engineer), or somewhere between the two extremes.

In optional operation 204, a role or function of the member is determined. In some implementations, the system hosting the member community may possess this information, which may identify the member's job position, title, role, or function within the organization that employs him. In some other implementations, his role or function may be inferred from the content he consumes, his activity within the member community, the roles/functions of members he is connected to, his skills (e.g., as posted to his community profile), his explicit characterization, and/or other information. Multiple roles/functions may be identified for some members, and may apply at different times of a day, different days of a week, etc. The member's role or function may provide additional evidence regarding content topics that interest him, may help indicate the nature of events he participates in (e.g., meetings, conferences, trade shows), and/or may be used for some other purpose(s).

In operation 206, the member's usual, normal, and/or current locations are learned. Illustratively, his profile in the community may identify his residential area and/or work location (e.g., city, state, country), or he or a device he operates may provide a more exact location (e.g., address, geographic coordinates). Therefore, from the location information, the time of day for the member may be determined, the system may be able to confirm that he is (or is not) at a normal work location, that he is on his way to or from work, that he is in a city different from his residence and his work, etc.

In optional operation 208, data from the member's calendar or schedule is received or accessed. Illustratively, the member may grant permission for the member community (or a service within the community that provides access to content and/or that sends content event notifications) to access an application that maintains his calendar, or the system may provide a calendar service or application to community members and maintain corresponding data.

If calendar data is obtained, the system may parse the data covering some period of time (e.g., the current day, the next X days, the current/next week) to identify meetings, conferences, interviews, assigned tasks, and/or other events and obligations of the member that are scheduled to occur during that time. The data may also be processed to identify, or at least to attempt to identify, content topics associated with some or all events.

Thus, if a meeting is scheduled that has an associated subject or purpose, natural language processing may be applied to distill that information and identify one or more corresponding topics. For example, a meeting with a subject of "Brainstorming for new electronic messaging project" may be processed to identify "brainstorming" and "electronic messaging" as relevant topics.

In some embodiments, content available to community members may be tagged or characterized with predetermined topics with any desired level of precision. Thus, some topics may be very broad (e.g., art, technology, travel). Other topics may be more granular (e.g., sculpture, opera, computer programming, databases, foreign travel, domestic vacations). Yet other topics may be quite precise (e.g., Renaissance paintings, Javascript programming, luxury trips to Hawaii). A given topic may be nested within other topics any number of levels.

Thus, the community may have a set of predetermined topics that can be used to not only characterize individual content items, but also activities and events involving members and/or content items, and/or roles/functions of individual members.

In operation 210, one or more time slots of availability are defined for the member, and may be associated with one or more topics that are believed to be relevant to the member during those time slots. If, for example, the member's calendar was accessed in operation 208 and one or more meetings, interviews, and/or other events were identified and characterized (e.g., with relevant content topics), complementary time slots may be defined for some or all of the events. A complementary time slot may coincide with the starting and ending times of an event, may encompass some portion or the event (or the entire event) and possibly some time before and/or after the event, may be scheduled adjacent to the event, or may occur relatively close in time before or after the event.

As another example, if analysis of the member's pattern of usage of the community or of a content-serving service within the community indicates that he often accesses content of a particular topic or set of topics during a particular time period (e.g., most afternoons between 1 pm and 1:30 pm), a complementary time slot may be defined to accompany an occurrence of that time period.

Within these time slots that have associated topics, in different implementations different numbers of content event notifications may be sent (e.g., no more than one, a maximum of three). In some embodiments, only content event notifications related to or relevant to a time slot's topic(s) may be sent during the time slot.

In some implementations, data from the member's calendar (and/or other information) may be used to identify a notification-free period or a time slot during which no notifications should be sent to the member. For example, if the member has a job interview from 2 pm to 3 pm, the system may define that as a time slot during which no content event notifications should be sent.

Some time slots of availability of the member may be identified dynamically, at any time. For example, whenever the member opens an application supported or hosted by the system, perhaps to view content offered by the system, a time slot may be established. If this dynamic time slot is near in time to a known event (e.g., an event learned from his calendar data), it may be associated with a topic that applies to the event. If there is no known event close in time to the dynamic time slot, then any or all topics known or suspected to be of interest to the member may be associated with the slot.

A given time slot may be short (e.g., on the order of minutes) such as a half-hour slot before a status meeting or an interview, or may be longer (such as an hour or two hours), perhaps to encompass the meeting or interview. A time slot may be even longer, such as a commuting time slot, an 'evening' time slot after work, or a 'weekend' time slot that encompasses some or all of a weekend. Some time slots may be longer still, perhaps to cover an extended event such as a conference regarding software development or some other topic of interest to the member.

In operation 212, content events or content event notifications that are candidates for being sent to the member are collected. In particular, the system may continually collect events or notifications regarding events, or at least between content-specific time slots and during periods when no notifications are sent.

Thus, each time a new candidate content event is identified, such as when an associate or friend of the member uploads or interacts with a content item that matches the member's interests (e.g., because it belongs to a topic deemed to be of interest to the member), the system treats the event as a candidate for initiating a notification to the member.

In embodiments in which notifications regarding events associated with a given content topic can be sent only during time slots associated with the topic, outside of those time slots the system will collect related content events and rank or weight them according to their perceived relevance or interest to the member. Thus, if only one notification (or other limited number of notifications) may be dispatched during a time slot associated with an "electronic messaging" topic, up until that time slot the system will strive to identify the most relevant content event(s), for which content notifications (or a single notification) will be issued during the time slot.

Each collected content event may have an expiration date (e.g., twelve hours, one day, three days), after which it is removed from the collection. Items and events are also removed if and when corresponding notifications are issued to the member. Thus, upon recognition of a new content event involving a particular content item (which is associated with one or more particular content topics), a notification platform or service may identify a member (or members) associated with the event (e.g., the member that initiated the event), identify other members that follow or are otherwise connected to the initiating member, and possibly identify yet other members that have keen interest in the content item (or its topic(s)). For each other member, the notification platform may also calculate a relevance of the item to the member, thereby establishing some priority among different content event notifications that are candidates for being dispatched to a given member.

In some embodiments, a collection of content events may be indexed, keyed, or otherwise organized by content topic, and may illustratively be ranked, weighted, or prioritized (within each topic) by relevance or interest to the member. A given event may be associated with multiple topics, in which case it may be cross-indexed under each corresponding topic. In these embodiments, whenever a notification can be sent regarding a particular topic (e.g., during a predetermined or dynamically defined time slot), the notifications sent are based on the most relevant event(s).

As one alternative, collected content events may be organized by time slot (i.e., predetermined time slots having associated content topics), and may also be ranked by relevance within each time slot. Because multiple topics may be associated with a single time slot, content events related to different topics may be analyzed to determine which has or have the most relevance. Then, upon reaching a given time slot, the event for which a notification will be issued is readily identifiable. Because a given content event may correspond to multiple topics, the event may be cross-indexed in multiple time slots. For content topics that are not associated with any defined time slots, corresponding content event notifications may be sent between time slots (if the system or member permits such action), or a tentative time slot may be dynamically defined and associated with one or more topics that don't already have associated time slots.

As yet another alternative, collected content events may be organized or ranked according to their perceived relevance or interest to the member. Then, whenever a content event notification can be issued for a particular topic (or set of topics—such as during a time slot when multiple topics are considered relevant), the highest-ranked event that is associated with an acceptable topic can be used to issue a content event notification.

In operation 220, the system determines whether a time slot is open that has one or more associated or corresponding content topics. If so, the method continues at operation 222; otherwise, the method advances to operation 224.

In operation 222, the system (e.g., a notification platform) identifies one or more content events—usually the ones most relevant to the member—and issues corresponding notifications. The number of events that may be dispatched during a given time slot may be limited (e.g., 1, 2, 5), and may vary from one time slot (or one associated content topic) to another. Illustratively, if multiple content topics are associated with the open time slot, the maximum/threshold number of events that may be issued may be applied to each topic or may be divided among the topics. If multiple notifications are issued, they may be dispatched in unison, may be evenly spaced throughout the time slot, or may be scheduled in some other manner. After operation 222, the method advances to operation 230.

In operation 224, applicable content event notification restrictions are applied. In some embodiments, all content event notifications, or possibly content event notifications regarding one or more selected topics, may only be issued during predetermined and/or dynamically identified time slots. Between time slots, no notifications (or no notifications regarding the selected topics) may be sent. In other embodiments, one or more topics may be identified for which content event notifications may be issued outside of any defined time slots.

In operation 230, the system may adjust the notification scheme for the member over time, as it learns from the member's behavior and/or explicit member requests or instructions. For example, if a half-hour time slot was defined before a regular (e.g., daily, weekly) meeting having a particular subject, the duration of the time slot may be increased if the member usually spends most or all of that time period accessing content that is relevant to the meeting. The system may also (or instead) increase the number of content event notifications that may be dispatched to the member during that time slot.

As another example, if the member never responds to a notification regarding an event associated with a given topic (e.g., by opening the corresponding content), the system may disassociate that topic from the time slot(s) with which it was associated. If there are no other topics associated with the time slot, it may be deleted.

In general, the system may adjust any aspect of the member's content event notification scheme, based on the member's observed behavior and/or an explicit request from the member.

The following is an illustrative and non-limiting notification scheme for a member of a professional network. In this example, time slots and/or content topics that may be associated with individual time slots may be grouped into a limited number of general categories, such as Commute (e.g., to cover the member's commutes), Preparation (e.g., to cover preparation for some event), and Casual (e.g., to cover time periods when little or no professional content event notifications should be sent). Sub-categories may also be established, such as Interview (e.g., to cover interviews with potential employers and/or potential new hires), Work (e.g., to cover work-related topics), Skills (e.g., to cover topics related to the member's skill set), Home (e.g., to cover personal or private topics), etc.

A given topic, such as Self Improvement for example, may include different content events or types of events depending whether it is being placed in a Work time slot or a Home time slot. The former may encompass work-related self-improvement content, while the latter may encompass personal- or family-related self-improvement content.

A first time slot may be defined between 8:00 am and 8:45 am every work day to encompass the member's commute to work. During this Commute time slot, notifications may be limited to Work and Skill topics, while her thoughts relate to her professional work. In particular, she may have identified Work-related topics such as Productivity, Self-Improvement, and Excellence as being of general interest to her professionally, and Skill-related topics such as iOS Development, API (Application Programming Interface) Design, and API Documentation as also being of general professional interest.

If the member has a meeting scheduled at 9:00 am, such as a daily team meeting, a Preparation time slot may be defined from 8:45 am to 9:00 am with associated topics such as Team Meeting, Negotiation, and Kindness.

If she has a one-one-one meeting with her supervisor at 11:00 am, a second Preparation time slot may run from 10:45 am to 11:00 am with topics such as How to Sell Your Idea, Communicating to Stakeholders, Negotiation, People Skills, and Body Language.

Assuming she has another meeting from 3:00 pm to 4:00 pm regarding a specific project involving electronic communications, another Preparation time slot may run from 2:40 pm to 3:00 pm with topics such as Tech Talk, Communication Systems, Architecture of Communication Systems, and Psychology of User Behavior.

If the member has an interview at 5:00 pm, yet another Preparation time slot may be defined from 4:30 pm to 5:00 pm and be associated with Interview topics such as Interview Skills, Technical Interview, Latest Uploads and Posts (regarding the potential employer or new hire), and Public Relations, and Preparation topics such as Presentation Skills, Recruiting, and Communication Skills.

An evening Commute time slot covering 6:00 pm to 6:30 pm may be associated with Home topics such as Work/Life Balance, Self-Improvement, and Humor.

A final work day (or daily) time slot may extend from 8:00 pm to 8:00 am and be defined as a no-notification or Do Not Disturb period during which no notifications should be sent.

Figure 3:
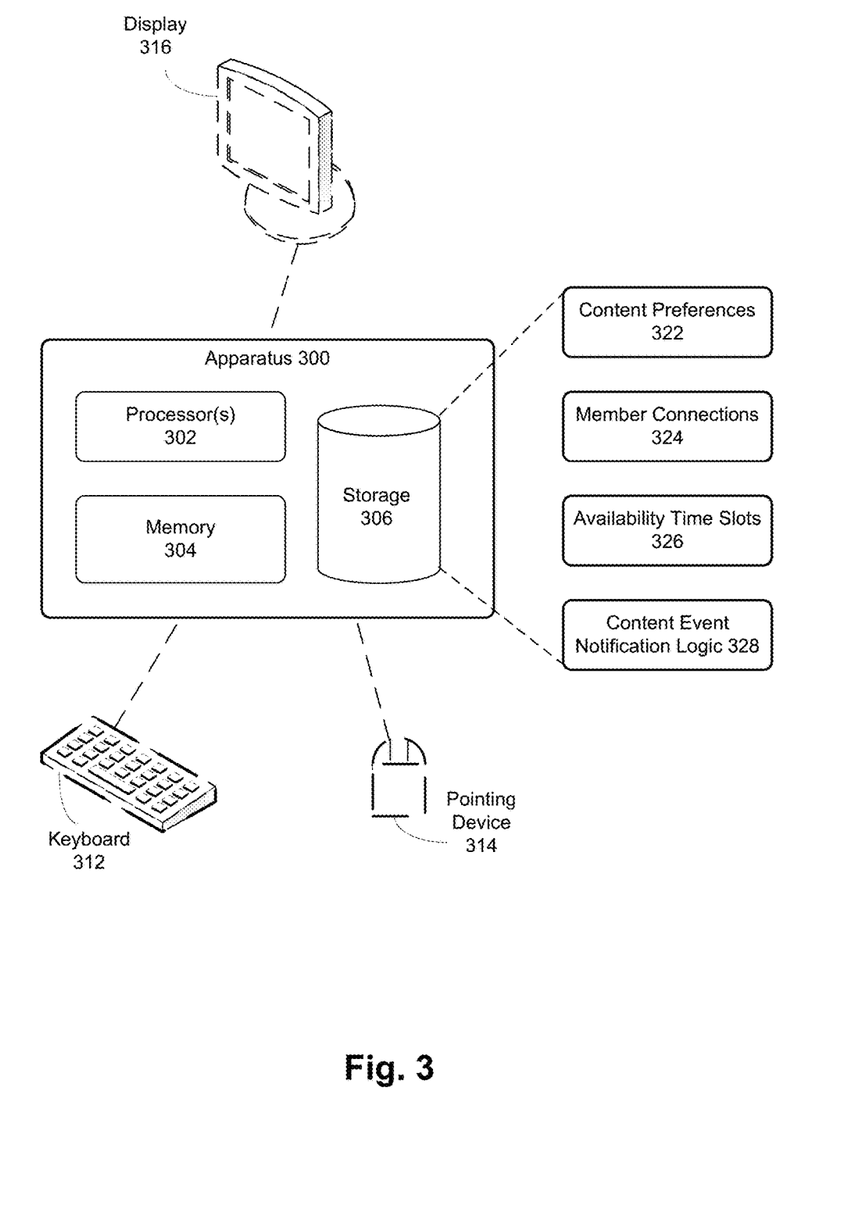
FIG. 3 depicts an apparatus for issuing content event notifications in accordance with some embodiments.

FIG. 3 is a block diagram of an apparatus for issuing content event notifications, according to some embodiments.

Apparatus 300 of FIG. 3 includes processor(s) 302, memory 304, and storage 306, which may comprise one or more optical, solid-state, and/or magnetic storage components. Storage 306 may be local to or remote from the apparatus. Apparatus 300 can be coupled (permanently or temporarily) to keyboard 312, pointing device 314, and display 316.

Storage 306 stores data used by apparatus 300 to manage content event notification schemes for members of a user community, such as members of a professional (or social) network. For example, content preferences 322 identify a member's preferred content and/or content that he accesses most frequently. Illustratively, the content preferences may be expressed in terms of content topics.

Storage 306 also stores member connections 324 for a given member, which identify the given member's connections within the community—such as other members that he follows, members he is connected to, members that are similar to him in some respect (e.g., they have one or more similar or matching profile attributes), etc.

Yet further, storage 306 stores time slot data 326 that identifies time periods during which the apparatus may, should, or should not issue content event notifications to the member. Each time slot may be associated with any number of content topics for which notifications may be issued during the slot, unless the slot is configured as one during which no content event notifications should be issued to the member.

Storage 306 also stores logic that may be loaded into memory 304 for execution by processor(s) 302, such as content event notification logic 328. In other embodiments, this logic module may be divided to separate its functionality as desired.

Content event notification logic 328 comprises processor-executable instructions for selecting content for which notifications could or should be sent to the member, based on content events that involve other members identified in member connections 324 and/or the member's content preferences 322. In some embodiments, some types of notifications (e.g., regarding certain content topics) may only be issued during specific time periods identified in time slot data 326.

Logic 328, when executed by processor(s) 302 thus manages the notification scheme for one or more members. It may not only be used to determine which notifications to issue, and to initiate their dispatch, but may also be used to assemble and/or maintain data stored in storage 306 (e.g., to identify a member's content preferences 322, to define time slots 326 for the member).

Apparatus 300 may also include logic that comprises processor-executable instructions for identifying content and/or content topics of interest to a member. Such logic may be part of or separate from logic 328. As another alternative, information may be received from an external entity regarding content and/or content topics that interest a member. For example, a system that includes apparatus 300 may include a separate component for identifying and/or recommending such content and/or content topics.

After a content event notification is issued to and received by a member, that member may connect to the system, service, or platform that hosts the content item(s) corresponding to the notification. The system may then present the item(s), and may also offer other similar or related content, such as content within the same content topic and/or content for which notifications were not sent because of a limit on a number of notifications that may be sent at a particular time or during a particular time slot.

In some embodiments, apparatus 300 performs some or all of the functions ascribed to one or more components of system 110 of FIG. 1.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of notifying a user of available electronic content, the method comprising:
    identifying a set of content topics of interest to the user;
    automatically defining one or more time slots of availability of the user for receiving content event notifications, wherein the one or more time slots are not defined by the user;
    associating with each defined time slot a subset of the plurality of content topics of interest to the user;
    identifying content events within a user community that includes the user, each content event involving a content item having a corresponding content topic;
    for each defined time slot, identifying a subset of the identified content events based on the subset of content topics associated with the defined time slot and a timing of the defined time slot; and
    during a defined time slot, issuing no more than a threshold number of content event notifications for the subset of the identified content events corresponding to the subset of content topics associated with the time slot, and issuing no content event notifications corresponding to content topics not associated with the time slot;
    wherein the one or more time slots are defined prior to identifying any content events for which notifications are to be issued during the one or more time slots.

2. The method of claim 1, wherein defining one or more time slots comprises:
    accessing calendar data of the user;
    identifying a scheduled event within the calendar data; and
    defining a first time slot to complement the scheduled event.

3. The method of claim 2, wherein associating a first content topic with the first time slot comprises:
    from the calendar data, identifying a nature of the scheduled event; and
    selecting as the first content topic a content topic that matches the nature of the scheduled event.

4. The method of claim 1, wherein identifying content events within a user community comprises:
    recognizing a first content event involving a first content item; and
    determining whether the first content event involves another user, within the user community, to whom the user is connected.

5. The method of claim 4, wherein identifying content events within a user community further comprises:
    when the first content event does not involve another user within the user community to whom the user is connected, determining whether a relevance of the first content item to the user is above a threshold.

6. The method of claim 1, wherein identifying content events within a user community comprises:
    for each identified content event, determining a relevance of the involved content item to the user, with regard to the content topics of interest to the user; and
    storing data identifying the content event and the involved content item for no more than a maximum period of time.

7. The method of claim 1, further comprising, after issuing a first content event notification to the user for a first content event involving a first content item:
    establishing a communication session with the user; and
    presenting the first content item to the user.

8. The method of claim 1, wherein associating with each defined time slot a subset of the plurality of content topics of interest to the user comprises, for a first time slot:
    identifying a location of the user at a first time, wherein the first time slot comprises the first time; and
    from the location, identifying a content topic to associate with the first time slot.

9. An apparatus, comprising:
    one or more processors; and
    memory storing instructions that, when executed by the one or more processors, cause the apparatus to:
        identify a set of content topics of interest to a user;
        automatically define one or more time slots of availability of the user for receiving content event notifications, wherein the one or more time slots are not defined by the user;
        associate with each defined time slot a subset of the plurality of content topics of interest to the user;

identify content events within a user community that includes the user, each content event involving a content item having a corresponding content topic;

for each defined time slot, identify a subset of the identified content events based on the subset of content topics associated with the defined time slot and a timing of the defined time slot; and during a defined time slot, issue no more than a threshold number of content event notifications for the subset of the identified content events corresponding to the subset of content topics associated with the time slot, and issue no content event notifications corresponding to content topics not associated with the time slot;

wherein the one or more time slots are defined prior to identifying any content events for which notifications are to be issued during the one or more time slots.

10. The apparatus of claim 9, wherein defining one or more time slots comprises:

accessing calendar data of the user;

identifying a scheduled event within the calendar data; and defining a first time slot to complement the scheduled event.

11. The apparatus of claim 10, wherein associating a first content topic with the first time slot comprises:

from the calendar data, identifying a nature of the scheduled event; and selecting as the first content topic a content topic that matches the nature of the scheduled event.

12. The apparatus of claim 9, wherein identifying content events within a user community comprises:

recognizing a first content event involving a first content item; and determining whether the first content event involves another user, within the user community, to whom the user is connected.

13. The apparatus of claim 12, wherein identifying content events within a user community further comprises:

when the first content event does not involve another user within the user community to whom the user is connected, determining whether a relevance of the first content item to the user is above a threshold.

14. The apparatus of claim 9, wherein identifying content events within a user community comprises:

for each identified content event, determining a relevance of the involved content item to the user, with regard to the content topics of interest to the user; and storing data identifying the content event and the involved content item for no more than a maximum period of time.

15. The apparatus of claim 9, wherein the memory further stores instructions that, when executed by the one or more processors, cause the apparatus to:

establish a communication session with the user; and present the first content item to the user.

16. A system, comprising:

one or more processors; and a content identification module comprising a non-transitory computer-readable medium storing instructions that, when executed, cause the system to identify a set of content topics of interest to a user; and a notification module comprising a non-transitory computer-readable medium storing instructions that, when executed, cause the system to:

automatically define one or more time slots of availability of the user for receiving content event notifications, wherein the one or more time slots are not defined by the user;

associate with each defined time slot a subset of the plurality of content topics of interest to the user;

identify content events within a user community that includes the user, each content event involving a content item having a corresponding content topic;

for each defined time slot, identify a subset of the identified content events based on the subset of content topics associated with the defined time slot and a timing of the defined time slot; and during a defined time slot, issue no more than a threshold number of content event notifications for the subset of the identified content events corresponding to the subset of content topics associated with the time slot, and issue no content event notifications corresponding to content topics not associated with the time slot;

wherein the one or more time slots are defined prior to identifying any content events for which notifications are to be issued during the one or more time slots.

17. The system of claim 16, wherein defining one or more time slots comprises:

accessing calendar data of the user;

identifying a scheduled event within the calendar data; and defining a first time slot to complement the scheduled event.

18. The system of claim 17, wherein associating a first content topic with the first time slot comprises:

from the calendar data, identifying a nature of the scheduled event; and selecting as the first content topic a content topic that matches the nature of the scheduled event.

19. The system of claim 16, wherein identifying content events within a user community comprises:

recognizing a first content event involving a first content item; and determining whether the first content event involves another user, within the user community, to whom the user is connected.

20. The system of claim 19, wherein identifying content events within a user community further comprises:

when the first content event does not involve another user within the user community to whom the user is connected, determining whether a relevance of the first content item to the user is above a threshold.

21. The system of claim 16, wherein identifying content events within a user community comprises:

for each identified content event, determining a relevance of the involved content item to the user, with regard to the content topics of interest to the user; and storing data identifying the content event and the involved content item for no more than a maximum period of time.

* * * * *